United States Patent Office — 3,485,721 — Patented Dec. 23, 1969

1

3,485,721

PROCESS FOR GROWING MYCOPLASMA PNEUMONIAL ORGANISMS

Allen F. Woodhour, Horsham, and Don P. Metzgar, North Wales, Pa., assignors to Merck & Co., Inc., Rahway, N.J., a corporation of New Jersey No Drawing. Continuation-in-part of application Ser. No. 432,386, Feb. 12, 1965, and a division of application Ser. No. 517,468, Dec. 29, 1965. This application Apr. 24, 1968, Ser. No. 736,886
Int. Cl. A61k *23/00;* C12b *1/00;* C12k *1/06*
U.S. Cl. 195—80 1 Claim

ABSTRACT OF THE DISCLOSURE

A substantial amount of the organism *Mycoplasma pneumoniae* for use in making a vaccine is obtained by growing it in a selected culture media, harvesting the organism and incubating it.

This application is a continuation-in-part of our copending application, U.S. Ser. No. 432,386, filed Feb. 12, 1965, now abandoned, and is a division of our application Ser. No. 517,468, filed Dec. 29, 1965, now abandoned.

This invention is concerned with new media for the replication of *Mycoplasma pneumoniae* which additionally provides culture fluids that can be used for the preparation of vaccines substantially free from sensitizing substances.

Primary atypical pneumonia (PAP) is the terminology applied to certain nonbacterial forms of pneumonia. The indications are that it is due to *Mycoplasma pneumoniae* as it has been found that a serologic response to Eaton agent, a strain of *Mycoplasma pneumoniae,* occurs in approximately 90% of those PAP cases in which cold agglutinins develop during convalescence. A serological response to Eaton agent occurs as well in a significant number of agglutinin-negative pneumonias and also in about 10% of all lower respiratory infections investigated. Eaton agent is the Eaton strain of *M. pneumoniae,* and is commonly referred to as Eaton pleuropneumoniae-like organism or in abbreviated form as Eaton PPLO.

The disease has been produced in cotton rats and hamsters by intranasal instillation of the *M. pneumoniae* organism and has been prevented by neutralization of the organisms with convalescent sera from patients with clinically diagnosed PAP.

A major advance in the study of Eaton agent was made in 1961 when the organism was isolated and identified in artificial medium containing horse serum which was considered to be an ingredient essential for its growth. That medium contained relatively large quantities of components which made it unsatisfactory for growth of the organisms for vaccine production, particularly 5% beef heart for infusion, 1.0% peptone, 10% whole yeast extract and 20% horse serum. The objectionable materials, particularly horse serum and yeast extract, were required in large concentrations and imposed two hazards: (1) sediments which were difficult if not impossible to remove from concentrated organisms, and (2) the danger of sensitizing vaccine recepients with the contaminating components.

It has been found that *M. pneumoniae* can be grown in the novel media which comprise one feature of this invention which are free of horse serum and which give high yields of organisms that can be isolated, for vaccine production purposes, substantially devoid of potential sensitizing materials. It has been found that the high concentration of horse serum that was previously thought to be essential to the replication of *M. pneumoniae* can

2 be replaced by the use of substances hereinafter referred to as Group A substances. This involves the use of egg allantoic fluid, or a combination of albumin, dextrose and arginine or a combination of egg allantoic fluid with one or more of the agents selected from albumin, dextrose and arginine; the total quantity of these substances taken singly or in combination being between about 0.1 to 20% (preferably 0.5 to 10%) of the total medium. Any albumin known to be suitable for use in injectable preparations can be used, for example, human albumin, ovalbumin, lactalbumin hydrolysate or mixtures thereof.

It additionally was found that the yeast extract used in the prior art medium also can be either replaced by certain combined chemical substances (hereinafter referred to as Group B substances) or used itself in such small quantities as to be more readily removed during the procedures followed in preparing the vaccine. Chemical substances which when used in combination were found to be suitable substitutes for yeast extract (i.e. the Group B substances) are cholesterol, lecithin, and diphosphopyridine nucleotide (DPNH reduced), the total amount of any two or more of said agents representing no more than 0.025% of the total media. When yeast extract is used, it, too, represents no more than 0.025% of the total media.

The remainder of the media (Group C substances) comprises the usual aqueous phase containing salts, buffers and the like conventionally used in the preparation of fluid culture media. The pH of the media is adjusted to between 6.6–8.0, but preferably between about 7.2–7.4.

Two media that have been found especially suitable for the growth of *M. pneumoniae* have the following compositions:

MEDIUM I

| | Percent of composition |
|---|---|
| Group A substance: | |
| Lactalbumin hydrolysate (Edamin type S, Sheffield Chemical, Norwich, N.Y.) | 0.5 |
| Egg allantoic fluid | 10.0 |
| Group B substance: | |
| Yeast extract | 0.025 |
| Group C substance: | |
| Hanks' balanced salt solution (10×) | 10.0 |
| Sodium bicarbonate (2.8%) | 2.0 |
| Distilled water qs | 100.0 |

MEDIUM II

| | Percent of composition |
|---|---|
| Group A substances: | |
| Lactalbumin hydrolysate (Edamin type S) | 0.75 |
| Human albumin | 0.625 |
| Dextrose (U.S.P.) | 1.0 |
| L arginine, HCl (1.5 mm.) | 0.0316 |
| Group B substances: | |
| Cholesterol (U.S.P.) | 0.0005 |
| Lecithin (L,α synthetic) | 0.001 |
| Diphosphopyridine nucleotide (DPNH reduced) | 0.0004 |
| Group C substances: | |
| Sodium bicarbonate | 0.0028 |
| Hanks' balanced salt solution (10×) | 10.0 |
| Distilled water qs | 100.0 |

Medium I is prepared by dissolving the yeast extract and lactalbumin hydrolysate in a portion of the distilled water. Egg allantoic fluid is removed aseptically from 10 to 12 day embryonated hens' eggs and sterilized by passage of the fluid through any suitable filter such as a filter candle. Medium I components then are combined in the proportions indicated above usually in the following order: Hanks' balanced salt solution (Hanks' BSS), sodium bicarbonate (to adjust pH to 7.2–7.4), the yeast lactalbumin solution, allantoic fluid and the remaining water. This mixture then is mixed by agitation or other mechanical means and sterilized by passage through any suitable filter.

A medium similar to Medium I can be made replacing the lactalbumin hydrolysate with a like amount of another suitable albumin or mixture thereof of the type mentioned above.

Medium II is prepared by rapidly stirring to dissolve the lecithin and cholesterol in a small quantity of absolute ethyl alcohol which then is added slowly to a portion of the distilled water with vigorous agitation. To this solution is added with continued stirring the arginine, dextrose and diphosphopyridine nucleotide. Then the lactalbumin is added and the mixture shaken vigorously to effect its dissolution. This represents a stock solution which is combined with the human albumin, Hanks' BSS, sodium bicarbonate (to adjust pH to 7.2–7.4) and the remaining distilled water.

The Group A substances used in Medium II can be replaced by any of the Group B substances identified above.

The composition of each of the media as presented above represents optimal concentrations. Considerable variation in the concentrations of each of the components is possible within the preferred ranges mentioned. The composition of both media is such that potential sensitizing substances such as yeast, if present, will be present initially in low concentrations and due to the vaccine process hereinafter described, are reduced to negligible levels. The hazard inherent in the use of horse serum is, of course, substantially reduced by use of the novel media of this invention.

Another part of this invention is concerned with the development of a process for the production of an inactivated Eaton PPLO vaccine. Viable Eaton PPLO are inoculated into one of the above-described serum-free media as a 5 to 10% inoculum containing approximately $10^5$ to $10^{10}$ organisms per ml. (The inoculum can be made by initially growing the organism in Media I or II or by growing PPLO in any culture media known to support its growth.) Inoculated Medium I or Medium II cultures are incubated at about 37° C. in an aerobic atmosphere, for a sufficient number of days, usually from 7 to 14, to raise the total population of organisms to approximately $10^5$ to $10^{10}$ per ml. in the growth medium.

At the end of the incubation period the culture vessels are agitated vigorously to resuspend any organisms which might adhere to the surfaces of the culture vessel. The suspension containing the organisms then is centrifuged at 20,000 to 50,000 r.p.m. preferably in a continuously flowing, refrigerated centrifugation system where the flow rate is about 1200–3000 ml./hr. After all of the PPLO suspension has passed through the centrifuge, buffered saline solution (0.006 M sodium phosphate, 0.7% sodium chloride, pH 7.2) or other acceptable diluent is flowed through the centrifugation system in a ratio of about 1 liter per 5 liters of harvest fluid to wash the sedimented organisms and remove residual growth medium.

The sedimented organisms (product A) are removed from the centrifuge rotor by appropriate means (scraping, agitation, etc.), and the bowl fluid can be discarded or it can be saved and used as described below. The organisms thus obtained are highly purified and can be used to prepare a vaccine concentrate by resuspending product A in buffered saline solution, and inactivating the organisms, or product A can be further purified as described below either prior to or subsequent to inactivation.

The above organisms (product A) can be resuspended to any desired concentration in buffered saline solution, pH 7.0–7.2, or other diluent acceptable for injectable preparations. Thereafter, the PPLO are inactivated by usual methods as by the addition of formalin USP to a final concentration of 1:400–1:4000 and then incubated for about 24 hours at about 37° C. Other suitable inactivating materials or methods also can be uesd, as by heating at about 37° C. for from 7–10 days, or by adding phenol to a final concentration of about 0.5% and the like. The residual unbound formalin can be neutralized with sodium bisulfite and dialyzed against saline solution for 48 hours, or it can be left untouched.

The suspension of inactivated organisms thus obtained (which, for convenience is identified as product B) is suitable for use in the preparation of a vaccine as described hereinbelow or, if desired, residual protein impurities can be removed from product B by the following procedure.

To remove the residual proteins, product B is subjected to high speed centrifugation wherein the organisms are sedimented at about 16,000 r.p.m. for about 45–60 minutes. The supernatant fluid is discarded and the organisms resuspended to original volume or to any desired concentration, in phosphate buffered saline solution or other suitable diluent to give product C–1. Essentially all of the measurable extraneous protein is removed by this method.

Alternatively, residual protein can be removed from the sedimented organisms (product A) and the yield of organisms increased by combining the sedimented organisms with the bowl fluid from the first centrifugation and then, if desired, adding buffered saline to give any desired concentration. This suspension then is subjected to high speed centrifugation (16,000 r.p.m. for about 45 minutes) to sediment the organisms. The supernatant fluid is discarded and the organisms harvested and resuspended to any desired concentration in buffered saline solution. The organisms are inactivated as described above for the preparation of product B and the concentrate thus obtained will be referred to below as product C–2.

Immediately after preparing the suspensions referred to above as products B, C–1 and C–2, a preservative is added, advantageously 20 $\gamma$/ml. formalin solution and 1:10,000 thimerosal.

Thereafter, these vaccine concentrates can be diluted to any desired antigenic concentration, and can be used singly or in combination with other vaccines, or they can be used to prepare a variety of vaccines, such as aqueous vaccines, alum absorbed vaccines, emulsified vegetable oil adjuvant vaccines, or Freund's adjuvant vaccines and the like.

Adequate quality control tests are performed with each vaccine formulation to insure acceptability as an injectable for man. Tests include safety evaluation in mice and guinea pigs as prescribed by the Division of Biologic Standards, N.I.H. (Public Health Service Regulations, Biological Products, Title 42, Part 73, reproduced in Public Health Service publication No. 437, revised 1964). Sterility tests are performed in thioglycollate and Sabouraud's broth according to the procedure outlined in the above NIH Regulations. In addition, tests are performed to: insure inactivation of the organisms, a pH of between about 6.5–7.2 although this may vary to slightly above or below this range, an alum content of no more than 15 mgs./dose (optimum 8 mgs./dose), a residual formaldehyde concentration of not more than 90 mcg./ml., usually about 20 mcg./ml., potency in animals and identification of the final product.

Potency of the vaccine is determined by the intramuscular injection of a group of hamsters (usually 10 per group) with 0.5 ml. of the inactivated vaccine at 0, 7 and 14 days. All animals are bled prior to vaccination and at 21 days after initial injection or a group of animals from the same group are exsanguinated at the beginning of the test; the injected animals only being bled 21 days after initiation of the test and usually at which time another group of hamsters from the same batch of animals is exsanguinated to determine whether spontaneous disease associated with or related to Eaton PPLO occured during the test period. Sera are assayed for antibody levels to Eaton PPLO by complement-fixation and/or serum neutralization techniques.

Identification of the final product is determined by complement-fixation, carried out by the method described by Osler et al., Amer. J. Syphilis, Gonorrhea and Venereal Diseases, 36:140 (1962).

Serum neutralization studies are carried out by conventional methods and the absence of sensitizing substances is also determined by well-known guinea pig sensitization tests.

The *M. pneumoniae* organisms used in the following examples were isolated on agar from a throat swab of a patient with primary atypical pneumonia. The samples were obtained from Dr. R. Chanock (N.I.H.) and identified as Eaton PPLO, sample numbers 3–1428, P6, 1/26, Fr. 4 and 1–1428, P6, 1/26, Fr. 4.

EXAMPLE 1

Step A.—Initial growth of Eaton PPLO in BHI

The contents (5.0 ml.) of 1 vital of Eaton PPLO seed with a titer of approximately $10^6$ colony forming units (CFU) per ml. were inoculated into beef heart infusion (BHI) broth (containing 5% beef heart for infusion, 1% peptone, 0.5% sodium chloride, 10% whole yeast extract and 20% horse serum); 1.0 ml. into each of 5 tubes containing 10.0 ml. of medium. After 7 to 9 days stationary incubation at 36–37° C., each culture was inoculated into 500 ml. of the same BHI medium and incubated in a stationary position for another 7 to 9 days at 37° C. Additional passages can be carried out until the desired concentration of organisms is obtained. In this preparation 10 passages were carried out.

Step $B_1$.—Final passage of PPLO in Medium I

Fifty ml. of the BHI propagated PPLO (10th passage) were inoculated into 950 ml. of New Medium I. A total of 19 liters of inoculated medium was prepared and incubated in a stationary position for 7 to 12 days at 37° C.

Step $B_2$.—Concentration of PPLO organisms from Medium I fluids

A pool of all production fluids was prepared aspectically. The PPLO were harvested from the medium by passage directly into a continuous flow refrigerated centrifuge revolving at 27,000 r.p.m. and at a flow rate of about 1500 ml./hour. The sedimented organisms were washed with 4 liters of phosphate buffered saline solution, pH 7.2, removed from the centrifuge rotor and reconstituted to a 60-fold concentration with 317 ml. phosphate buffered saline solution, pH 7.2.

A 1:40 dilution of formalin, U.S.P., was prepared in phosphate buffered saline solution, pH 7.2, containing 1:10,000 thimerosal. Then 1.0 ml. of 1:40 formalin was added to each 100.0 ml. of the PPLO suspension with constant agitation to yield a final concentration of 1:4000. The solution was incubated for 24 hours at 37° C. Thereafter, additional thimerosal was added as preservative to a final concentration of 1:10,000 after which the vaccine was stored at 4° C. without neutralization of the formalin.

TEST TO DETERMINE DEGREE OF INACTIVATION OF ORGANISMS

Five ml. of the 60-fold concentrated PPLO were removed from the inactivated bulk and used to inoculate ten BHI broth cultures which were incubated for seven days. Subsequently, 10 BHI agar plates were each inoculated with ten 0.01 ml. aliquots of material from the BHI broth cultures and incubated at 37° C. for 7 days. No viable PPLO were detected. Known viable Eaton PPLO were tested similarly to demonstrate the growth promoting properties of the BHI broth and BHI agar media. Preparation and ingredients of the BHI culture media are as described by Chanock et al., Proc. Soc. Exp. Biol. and Med. 110:543 (July, 1962).

Step C: vaccine preparation

Three vaccine formulations were prepared: aqueous vaccine, alum adsorbed and emulsified vegetable oil adjuvant. Each vaccine formulation was prepared at different antigenic concentrations derived from the 60-fold concentrated stock solution prepared in Step $B_2$, as monovalent vaccines or combined in multivalent respiratory agent formulations. All vaccines were stored at 4° C.

C–1 AQUEOUS PPLO VACCINE

The vaccine concentrate obtained as described in Step $B_2$ was diluted to 5, 10 and 20-fold concentrations with pyrogen-free phosphate buffered saline solution, pH 7.2, containing 1:10,000 thimerosal as preservative. They were filled in rubber-stoppered, aluminum-capped glass vials each containing 5.2 ml. of vaccine.

TEST METHODS AND RESULTS

Tests of the aqueous PPLO vaccine for safety, formaldehyde content, pH, sterility and potency were carried out using the above described procedures and the results were found to be satisfactory.

Potency in hamsters.—Five hamsters (80–120 grams) each were injected intramuscularly with 0.5 ml. of the respective vaccines at 0, 7 and 14 days. All animals were bled on day 21 to provide sera for the measurement of antibody titers by complement-fixation procedures. Immediately prior to the commencement of injection, 10 hamsters were exsanguinated to provide sera to serve as representative controls. Complement-fixation assays were performed with the sera. The results are presented in Table I. All antibody titers are expressed as the reciprocal of the initial serum dilution before the addition of any other reagents.

TABLE I.—COMPLEMENT-FIXATION ASSAY OF HAMSTER SERA

| Aqueous Vaccine | Geometric Mean Complement-Fixation Titer | |
|---|---|---|
| | 50% End point | 100% End point |
| 5X concentration | 2.5 | 2.5 |
| 10X concentration | 34.0 | 30.0 |
| 20X concentration | 69.0 | 52.0 |

Potency in humans.—Antibody responses in man were determined as follows: A mixed age population of female subjects was injected at 0, 28 and 180 days with 0.5 ml. of the aqueous vaccine formulations. Thirty subjects were used at each concentration. They were bled at 0, 28, 56, 112, 180, 201 and 365 days. Antibody responses were measured serologically by serum neutralization and complement-fixation techniques, and the results are given in Tables II and III.

TABLE II.—SERUM NEUTRALIZATION ASSAY OF HUMAN SERA

| Aqueous Vaccine | Geometric Mean Serum-Neutralization Antibody Titer at Indicated Day [1] | | | | | | |
|---|---|---|---|---|---|---|---|
| | 0 | 28 | 56 | 112 | 180 | 201 | 365 |
| 5X concentration | 8.0 | 10.0 | 14.0 | 13.0 | 16.0 | 13.0 | 32.0 |
| 10X concentration | 5.3 | 9.8 | 12.0 | 9.2 | 20.0 | 13.0 | 16.0 |
| 20X concentration | 4.6 | 10.6 | 13.0 | 14.0 | 21.0 | 14.0 | 20.0 |

[1] Reciprocal of initial serum dilution.

TABLE III.—COMPLEMENT-FIXATION ASSAY OF HUMAN SERA

| Aqueous Vaccine | Geometric Mean Complement-Fixation Antibody Titer at Indicated Day [1] | | | | | |
|---|---|---|---|---|---|---|
| | 0 | 28 | 56 | 112 | 180 | 201 |
| 5X concentration | 4.9 | 14.0 | 9.2 | 14.0 | 9.2 | 10.6 |
| 10X concentration | 4.3 | 8.6 | 9.8 | 6.1 | 9.8 | 18.0 |
| 20X concentration | 2.1 | 10.6 | 13.0 | 9.8 | 10.6 | 12.0 |

[1] Reciprocal of initial serum dilution.

Each of the aqueous vaccine formulations has been used experimentally in man as indicated without the development of any untoward clinical reactions.

C–2 ALUM ADSORBED PPLO VACCINE

Five, 10 and 20-fold concentrates of the Eaton PPLO vaccine concentrate from Step B–2 were prepared as described above with phosphate buffered saline solution (pH 7.2) containing 1:10,000 thimerosal. The antigen then was precipitated with potassium alum and resuspended to original volume. Precipitation was performed at pH 5.5 using 8.0 mg. of potassium alum ($KAlSO_4 \cdot 12H_2O$) for each ml. of PPLO concentrate. The alum absorbed PPLO were sedimented by centrifugation at 1700 r.p.m. for 15 minutes, the supernate decanted and the precipitate resuspended to original volume with phosphate buffered saline solution (pH 7.2) containing 1:10,000 thimerosal and 20 mcg./ml. formation and adjusted to pH 6.5. The vaccine was placed in sealed vials and stored at 4° C., and quality control tested in mice and guinea pigs as described above for the aqueous vaccines with no untoward reactions being observed in either the mice or guinea pigs.

Potency in hamsters.—Five-tenths ml. of each alum absorbed vaccine concentration was injected intramuscularly into groups of ten hamsters (each weighing 90–100 g.) at 0, 7 and 14 days. Animals were bled prior to injection and 21 days thereafter. Sera were assayed serologically by the serum-neutralization and complement fixation techniques described above for Eaton PPLO antibody titers. The results of these potency assays are given in Table IV.

TABLE IV.—COMPLEMENT-FIXATION AND SERUM NEUTRALIZATION ASSAYS OF HAMSTER SERA

[Geometric Mean Antibody Titer 21 Days Post Injection]

| Vaccine [1] | Complement-fixation | Serum neutralization | Percent sero conversion |
|---|---|---|---|
| 5X concentration | 42 | 26 | 100 |
| 10X concentration | 169 | 24 | 100 |
| 20X concentration | 640 | 45 | 100 |

[1] Eaton PPLO alum adsorbed.

Potency in humans.—Two groups of 10 female subjects of a mixed age population were injected intramuscularly at 0 and 28 days with 0.5 ml. of the respective vaccine formulations. They were bled prior to injection and at 7, 14, 28, 42 and 56 days thereafter. Sera were assayed serologically for antibody titers to Eaton PPLO by complement-fixation and serum-neutralization techniques described above. Results are as follows:

storage. They were quality control tested in guinea pigs and mice by the procedure described above with satisfactory results. Sterility tests in thioglycolate broth and Sabouraud broth, as described above, also gave satisfactory results. Potency tests of 60-fold concentrate aqueous bulk in adjuvant emulsion in hamsters by the above described protocol gave a geometric mean CF antibody titer of 1:20.

Potency in hamsters.—Three groups of ten hamsters each were injected intramuscularly at 0 and 12 days with 0.5 ml. of the adjuvant vaccine identified in Table VI. Animals were bled prior to injection and at 21 days thereafter. Results are as follows:

TABLE VI.—COMPLEMENT-FIXATION ASSAY OF HUMAN SERA

| Adjuvant Vaccine: | Geometric Mean Complement-Fixation Antibody Titer |
|---|---|
| 10X | 20 |
| 20X | 20 |
| 60X | 20 |

Potency in humans.—A mixed age population of female subjects was injected with 0.5 ml. of the respective adjuvant vaccine at 0 and 28 days. They were bled prior to injection and at 0, 28 and 56 days thereafter and assayed serologically by the CF and serum-neutralization (neut.) techniques described previously.

TABLE VII.—COMPLEMENT-FIXATION AND SERUM NEUTRALIZATION ASSAY OF HUMAN SERA

| | Geometric Mean Antibody Titers at Indicated Day | | | | | |
|---|---|---|---|---|---|---|
| | 0 | | 28 | | 56 | |
| Adjuvant Vaccine | CF | Neut. | CF | Neut. | CF | Neut. |
| 10X (25 subjects) | 2.6 | 7 | 4.3 | 56 | 7.0 | 21 |
| 20X (22 subjects) | 1.6 | 6.1 | 6.5 | 49 | 4.3 | 45 |
| Control (6 subjects) | 2.3 | 14 | 1 | 17 | 1.5 | 10 |

EXAMPLE II

The growth potential of Eaton PPLO in new Medium I was evaluated by comparing the growth curve in that medium with the growth curve when grown in the BHI medium containing horse serum previously considered essential for the replication of this organism. An inoculum of 500,000 CFU/ml. of Eaton PPLO was added to BHI broth (described in Example I, Step A) and to Medium I. Each was incubated at 37° C. and samples were withdrawn at the time intervals given below and assayed for titer. The following results were obtained:

TABLE V.—COMPLEMENT-FIXATION AND SERUM NEUTRALIZATION ASSAYS OF HUMAN SERA

| | Geometric Mean Antibody Titer at Indicated Day | | | | | | | | | | | | | |
|---|---|---|---|---|---|---|---|---|---|---|---|---|---|---|
| | 0 | | 7 | | 14 | | 28 | | 42 | | 56 | | 70 | |
| Vaccine (Eaton PPLO, alum adsorbed) | CF | Neut. | CF | Neut. | CF | Neut. | CF | Neut. | CF | Neut. | CF | Neut. | CF | Neut. |
| 10X concentrate | 3.0 | 9.2 | 2.8 | 12.0 | 13.0 | 11.0 | 8.0 | 34.0 | 4.9 | 30.0 | 7.0 | 56.0 | 4.0 | 32.0 |
| 20X concentrate | 4.0 | 10.6 | 7.0 | 12.0 | 24.0 | 15.0 | 7.0 | 21.0 | 7.0 | 52.0 | 13 | 56.0 | 6.5 | 37.0 |
| Uninoculated control (9 subjects) | 3.7 | 15.0 | 2.8 | 14.0 | 3.0 | 14.0 | 2.3 | 14.0 | 2.3 | 15.0 | 4.9 | 20.0 | 2.3 | 20.0 |

C–3 EMULSIFIED VEGETABLE OIL ADJUVANT VACCINES

Vegetable oil emulsified adjuvant vaccines were prepared at 10 and 20-fold antigenic concentrations. Concentrates were diluted to appropriate levels as described previously and incorporated into the emulsified vegetable oil adjuvent by the process described in U.S. Patent No. 3,149,036 issued Sept. 15, 1964, the disclosure of which is incorporated herein by reference. In general, the adjuvant is prepared by dispersing aluminum monostearate in a performed mixture of a vegetable oil such as peanut oil, and mannide monooleate with agitation and simultaneous heating, cooling the resulting dispersion and adding the appropriate dilution of the aqueous Eaton PPLO vaccine concentrate from Step $B_2$ with appropriate shear force to form the adjuvent emulsion. The final adjuvant vaccines were filled into 5 ml. glass syringes for

| | Titer CFU/ml. | |
|---|---|---|
| | BHI | Medium I |
| Hours after inoculation: | | |
| 20 | $10^{6.25}$ | $10^{6.5}$ |
| 42 | $10^{7.2}$ | $10^{7.25}$ |
| 96 | $10^{8.3}$ | $10^{8.2}$ |
| 136 | $10^{9}$ | $10^{9.25}$ |
| 172 | $10^{9}$ | $10^{9.25}$ |

These data establish that the replication of Eaton PPLO in Medium I is as good as that obtained by growing the organism in BHI broth containing horse serum and a large quantity of yeast extract.

EXAMPLE III

The contents (5 ml.) of 1 ampule of Eaton PPLO seed were inoculated into beef heart infusion broth (composition as described in Example I, Step A), 1 ml. into each of 5 tubes containing 9 ml. of medium. After 8 days stationary incubation at 36–37° C., 10 ml. of each culture were inoculated into 500 ml. of BHI broth medium and incubated in a stationary position for 10 days. Twenty-five ml. of the PPLO suspension then was inoculated into 500 ml. of liquid BHI medium and incubated in a stationary position for 16 days at 36–37° C. Subsequently, 100 ml. of the PPLO suspension were inoculated into 900 ml. of Medium II. A total of 18 liters of inoculated medium was prepared. The cultures were incubated in a stationary position for 7 days at 37° C.

An 18,000 ml. pool of all production fluids was prepared aseptically. The PPLO subsequently were harvested from the culture medium by passage through a centrifuge as described in Example I. Following centrifugation, revolving at 30,000 r.p.m. and at a flow rate of 3,000 ml./hour, the sedimented organisms were washed with 2 liters of phosphate buffered saline solution, pH 7.2. Immediately thereafter the sedimented washed organisms were removed from the centrifuge rotor and resuspended to a 60-fold concentration with 300 ml. of phosphate buffered saline solution, pH 7.2.

A 1:40 dilution of formalin USP was prepared in phosphate buffered saline solution, pH 7.2. Then, 3 ml. of 1:40 formalin were added to 295 ml. of the PPLO concentrate with constant agitation to yield a final concentration of 1:4000 formalin. The suspension was incubated for 24 hours at 37° C. Immediately thereafter, 3 ml. of 1% thimerosal were added to the suspension to yield a final concentration of 1:10,000 preservative, and the PPLO suspension incubated at 4° C. without neutralization of the formalin.

ALUM ADSORBED VACCINE

The 60-fold concentrate Eaton PPLO suspension was adsorbed onto alum ($KAlSO_4 \cdot 12H_2O$) as described in Example I. Precipitation was performed at pH 5.5 using 8.0 mg. of alum per ml. of PPLO concentrate. The alum adsorbed PPLO was resuspended in phosphate buffered saline solution, pH 7.2, containing 1:10,000 thimerosal and 20 mcg./ml. formalin and adjusted to pH 6.5.

Antibody response to the alum adsorbed Eaton PPLO vaccine was determined in hamsters. Five animals each were injected intramuscularly with 0.5 ml. of vaccine at 0, 7 and 14 days. The animals were bled at 21 days. Ten uninoculated animals also were bled to determine antibody status prior to vaccination. Sera were assayed for complement-fixation and serum-neutralization antibody titers by the above described methods with the results shown in Table VIII.

TABLE VIII.—CF AND SERUM NEUTRALIZATION ASSAY OF HAMSTER SERA

| | |
|---|---|
| Alum adsorbed vaccine | 60X conc. |
| Geometric mean antibody titer: | |
| Complement-fixation | 60. |
| Serum neutralization | 32. |

EXAMPLE IV

A pool of production fluids, obtained as described in Example I, Steps A and $B_1$ is prepared aseptically. The PPLO were harvested from the medium by passage directly into a continuous flow refrigerated centrifuge revolving at 27,000 r.p.m. and at a flow rate of about 1500 ml./hour. The sedimented organisms were washed with 4 liters of phosphate buffered saline solution, pH 7.2, removed from the centrifuge rotor with the residual bowl fluid so as to preclude loss of organisms by mechanical factor and reconstituted to a 60-fold concentration with 317 ml. phosphate buffered saline solution, pH 7.2.

A 1:40 dilution of formalin, U.S.P. was prepared in phosphate buffered saline solution, pH 7.2, containing 1:10,000 thimerosal. Then 1.0 ml. of 1:40 formalin was added to each 100.0 ml. of the PPLO suspension with constant agitation to yield a final concentration of 1:4000. The material was incubated for 24 hours at 37° C.

Thereafter, the inactivated organisms were centrifuged in a Spinco centrifuge (Model L, No. 21 rotor, stainless steel cups) at 16,000 r.p.m. for one hour. The sedimented organisms then were resuspended to original volume, or any desired volume, with phosphate buffered saline solution. Thereafter, additional thimerosal was added as preservative to a final concentration of 1:10,000 after which the vaccine was stored at 4° C. without neutralization of the formalin.

The antigen content of this vaccine then was precipitated with potassium alum and resuspended to original volume by the process described in Example I, Step C–2. This product will be identified as 4–A below.

Five additional lots of vaccine concentrate were prepared and converted to alum adsorbed vaccine by the method described above. Each of these vaccines (identified below as 4–B through 4–F) as well as the alum adsorbed vaccine identified as 4–A were separately tested for potency in hamsters by the protocol described in Example I, Step C–1 and the sera separately assayed by the complement-fixation technique giving the following results:

TABLE IX

| | Geometric Mean CF titer (50% fixation) | | |
|---|---|---|---|
| | Controls | | Vaccine-treated animals at Day 21 |
| | Day 0 | Day 21 | |
| Vaccine: | | | |
| 4–A | <1 | <1 | 128 |
| 4–B | <1 | <1 | 128 |
| 4–C | <1 | <1 | 80 |
| 4–D | <1 | <1 | 111 |
| 4–E | <1 | <1 | 111 |
| 4–F | <1 | <1 | 137 |
| Placebo | <1 | <1 | <1 |

The following table provides data concerning the residual protein concentration in a 60-fold concentrate of a PPLO suspension prepared by the method of Example I, Steps A through $B_2$ and the diminution of residual protein by rewashing the 60-fold concentrate by a further washing of the organisms by centifuging at about 16,000 r.p.m. in a Spinco centrifuge.

EFFECT OF WASHING 60-FOLD CONCENTRATED EATON PPLO SUSPENSIONS

| Description | Total non-dialyzable protein, mcg./ml. | Non-dialyzable non-sedimentable protein, mcg./ml. | Non-dialyzable sedimentable protein, mcg./ml. |
|---|---|---|---|
| 60-fold concentrate: | | | |
| Before Spinco centrifugation | 374 | 146 | 270 |
| After Spinco centrifugation | 222 | <5 | 242 |

Equivalent results can be obtained if, in Examples I and III, the formulation of Medium I and Medium II respectively is modified by replacing the Group A substances by from about 0.1 to 20% of—

(1) egg allantoic fluid, (2) a combination of albumin, dextrose and arginine; and (3) a combination of egg albumin with at least one substance selected from albumin, dextrose and arginine; and replacing the Group B substance by—

(1) a combination of cholesterol, lecithin, diphosphopyridine nucleotide, or
(2) yeast extract.

What is claimed is:

1. The process for obtaining *Mycoplasma pneumoniae* organisms to be used in a vaccine which comprises growing the organism in a medium having the following proportions by weight of the total composition:

(A) a substance selected from the group consisting of:
(i) 10.0% egg allantoic fluid and 0.5% albumin, and
(ii) 1.375% albumin and 1.0% dextrose and 0.0316% L. arganine
(B) a substance selected from the group consisting of:
(i) 0.025% yeast extract, and (ii) 0.0005% cholesterol and 0.001% lecithin and .0004% diphosphopyridine nucleotide
(C) a substance selected from the group consisting of:
(i) 10% Hank's balanced salt solution (10x) and 2.0% of sodium bicarbonate (2.8% solution), and
(ii) 10% Hank's balanced salt solution (10x) and 0.0028% sodium bicarbonate, and
(D) sufficient water to make up 100%.

References Cited

Frobisher, Fundamentals of Microbiology, published by W. B. Sanders Co., Philadelphia, 1962, p. 66.

RICHARD L. HUFF, Primary Examiner

U.S. Cl. X.R.

195—104; 424—88